United States Patent [19]
Wada

[11] Patent Number: 5,483,312
[45] Date of Patent: Jan. 9, 1996

[54] MECHANISM FOR POSITIONING A MAGNETIC HEAD RELATIVE TO A MAGNETIC SURFACE ON A PHOTOGRAPHIC FILM

[75] Inventor: Shigeru Wada, Kishiwada, Japan

[73] Assignee: Minolta Camera Kabushiki Kaisha, Osaka, Japan

[21] Appl. No.: 95,544

[22] Filed: Jul. 26, 1993

[30] Foreign Application Priority Data

Jul. 29, 1992 [JP] Japan ................................ 4-202214

[51] Int. Cl.⁶ ............................................... G03B 17/24
[52] U.S. Cl. .................................................. 354/106
[58] Field of Search ............................ 354/75, 76, 105, 354/106

[56] References Cited

U.S. PATENT DOCUMENTS 5,136,318  8/1992  Aoshima ................................ 354/105
5,155,511 10/1992  Tamamura .............................. 354/76

FOREIGN PATENT DOCUMENTS 4-11236  1/1992  Japan .
4-60531  2/1992  Japan .

Primary Examiner—David M. Gray
Attorney, Agent, or Firm—Burns, Doane, Swecker & Mathis

[57] ABSTRACT

A device for keeping a magnetic head for reading and/or writing magnetic information in precise position with respect to a magnetic surface of a film. A lever, one end of which is provided with a balancer and the other end of which is rotatably provided with a support plate, is rotatably mounted on a frame of an apparatus in which a film having a magnetic surface is used. On the support plate are mounted a magnetic head and a pair of pins located on both sides of the magnetic head with respect to a direction in which the film is fed. A pivot at which the lever is rotatably mounted on the frame of the apparatus is positioned in the vicinity of a center of gravity of the total system including the lever, the balancer and the support plate having the magnetic head and the pins. In the apparatus is provided a coil spring by which the lever is biased to the direction in which the pins are contacted with the edge extending longitudinally of the film. When an impulse is exerted on the apparatus to move it in a direction, there is no occurrence of rotational momentum of the lever around the pivot thereof.

13 Claims, 3 Drawing Sheets

MECHANISM FOR POSITIONING A MAGNETIC HEAD RELATIVE TO A MAGNETIC SURFACE ON A PHOTOGRAPHIC FILM

BACKGROUND OF THE INVENTION

1. Field of the Invention

The present invention generally relates to an apparatus such as a camera in which a photographic film having a magnetic surface is used, and particularly relates to a mechanism for constantly positioning a magnetic head for writing and/or reading magnetic information to or from the magnetic surface of the film, which is apt to move inside the camera body.

2. Description of the Related Arts

Conventionally, there has been provided a photographic film having a magnetic surface and an apparatus, such as a camera, having a magnetic head for writing and/or reading magnetic information with respect to the magnetic surface of the film. Taking a camera for an example, a film set inside the camera is generally free to move in a region between a pair of film guides installed inside the camera body, by which mechanism the film may tilt or move up and down relative to the camera body when the film is wound up on a spool or rewound into a film cartridge. Therefore, if such a film having a magnetic surface is applied to the camera, the signal output may drop down or there might occur signal errors on writing and/or reading the magnetic information relative to the magnetic surface of the film, due to the film moving up and down relative to the magnetic head or due to the film tilting relative thereto which induces some azimuth angles. Consequently, it is necessary to keep the magnetic head in the correct position with respect to the magnetic surface of the film in order to avoid such a malfunction.

On the other hand, it is difficult to keep a positional relationship constant between the magnetic head of the camera and the magnetic surface of the film by adopting a conventional technique of bending the path along which a magnetic audiotape is fed in order to keep the film in precise position with respect to the magnetic head, because the film is far more rigid than the audiotape.

To solve this problem, a mechanism for positioning the magnetic head relative to the magnetic surface of film instead of positioning the magnetic surface of the film relative to the magnetic head, has been presented in Japanese Laid-open Unexamined Patent Publication No. 3-273227.

FIGS. 1 and 2 show the conventional positioning mechanism for positioning the magnetic head relative to the magnetic surface of the film, disclosed therein. FIG. 1 is a rear elevation view of the mechanism while FIG. 2 is a sectional view taken along the line II—II of FIG. 1. In both figures, a reference numeral 11 indicates a camera body, 12 a film pressure plate, 13a and 13b a pair of guide rods, and 14 a magnetic head fixed to the film pressure plate 12. The camera body 11 has an aperture 11d, a pair of rails with surfaces 11a, apart from the front surface of the film pressure plate 12, extending along the upper and lower part of the aperture 11d between a film cartridge chamber and a spool chamber, a pair of first working faces 11b, each of which projects a bit greater amount than each of the faces 11a towards the front surface of the film pressure plate 12 and each of which is located alongside each of the faces 11a, slidably contacting with the front surface of the film pressure plate 12, and a pair of second working faces 11c each of which is located perpendicular to each of the first working faces 11b.

A pair of guide rods 13a, 13b are secured to the camera body 11 by a pair of pad plates 17a, 17b and screws 18a, 18b with the film pressure plate 12 being sandwiched between the guide rods 13a, 13b and the first working faces 11b of the body 11. These guide rods 13a, 13b extend in a crosswise direction of the film 19, with their axial centers being parallel to each other and to the surface of the film 19.

The film pressure plate 12 has a pair of projections 12a, 12b each of which is in the form of a circular arc coaxially located and each of which contacts each of the guide rods 13a, 13b from inside. The film pressure plate 12 is biased upwards by a pair of coil springs 16. One end of each spring is engaged to the film pressure plate 12 and the other end of each spring is engaged to the camera body 11. As shown in FIG. 1, the film pressure plate 12 has a pair of pins 15, secured thereto near its lower edge, with which the lower edge of the film 19 is contacted so that the magnetic head 14 is kept in position with respect to the magnetic surface of the film 19.

Namely, the movement of the film pressure plate 12 is limited by and between the first working faces 11b and the guide rods 13a, 13b in the direction of the optical axis, and the movement thereof is also limited by and between the second working faces 11c in the direction perpendicular to the direction in which the film 19 is fed, thus enabling the pressure plate 12 to rotate about its center of the circular arcs of the projections 12a within a limit.

According to this mechanism, the magnetic head 14 is kept in position with respect to the magnetic surface of the film 19 even if the film 19 tilts or moves up and down relative to the camera body while the film 19 is being fed, because the pins 15 contact with the lower edge of the film 19 by the biasing force of the coil springs 16, which makes it possible that the pins 15 follow the movement of the film 19.

FIG. 3 (I) is a diagrammatic view of the conventional mechanism of FIG. 1, illustrating that the pins 15 contact the lower edge of the film 19. As shown in this figure, one end of the coil spring 16 is engaged to the unillustrated camera body by a pin 16a, 16b secured thereto, respectively, and the other end of the spring 16 is engaged to the film pressure plate 12; therefore, the film pressure plate 12 is supported in a biased manner by the camera body.

If an impulse is momentarily exerted on the camera body in a direction perpendicular to the direction in which the film 19 is fed, as designated by the arrow in FIG. 3, the camera body will be accelerated towards the same direction as that of the impulse exerted thereto at the same time. Supposing that the film 19 is fixed relative to the camera body, the film pressure plate 12 has a tendency to remain stationary at the same location at this moment, because the film pressure plate 12 has its own inertia. In the case where the impulse is relatively large, it causes the film pressure plate 12 and the film 19 to move so that the pins 15 actually move away from the edge facing the pins 15 of the film 19, as shown in FIG. 3 (II), with the result that the impulse exceeds the biasing force of the coil springs 16.

Consequently, with this type of conventional mechanism, it is difficult to keep the magnetic head in precise position with respect to the magnetic surface of the film, when an impulse is exerted on the camera body to move it in a direction.

SUMMARY OF THE INVENTION

It is an object of the present invention to provide a mechanism for positioning a magnetic head relative to a magnetic surface of a film, in which the magnetic head is always kept in a precise position with respect to the magnetic surface of the film even if an impulse is exerted on an apparatus, in which the mechanism is provided, to move it in a direction.

In accomplishing this and other objects of the present invention, there is provided a mechanism for positioning a magnetic head relative to a magnetic surface of a film, comprising: a magnetic head assembly having a magnetic head for reading and/or writing magnetic information with respect to the magnetic surface of the film and positioning means for positioning the magnetic head relative to the magnetic surface of the film by contacting an edge extending longitudinally of the film; a balancer; biasing means for biasing the positioning means toward the edge of the film; and a lever rotatably mounted by a pivot on a frame of the apparatus, wherein the magnetic head assembly is mounted on the lever at one end thereof relative to the pivot whereas the balancer is mounted on the lever at the other end thereof relative thereto, wherein the pivot is positioned in the vicinity of a center of, the lever and the balancer preferably at a center of gravity of a total system including the magnetic head assembly.

In the above mechanism, the magnetic head assembly is adapted not only to move in the direction perpendicular to the direction in which the film is fed, but also to rotate relative to the lever, so that if the film tilts or moves up and down with respect to the frame of the apparatus while the film is being fed, the positioning means stays in contact with the edge of the film; in other words, the magnetic head is always kept in a precise position with respect to the magnetic surface of the film, which is sure to prevent an occurrence of signal error in reading and/or writing magnetic information relative to the magnetic surface of the film while the film is in motion.

Furthermore, since the pivot of the lever is positioned in the vicinity of a center of gravity of the total system including the magnetic head assembly, the lever and the balancer, there is not generated a rotational moment of the lever about the pivot even if the frame of the apparatus is accelerated in one direction. Consequently, when the frame of the apparatus is thus moved, the biasing force exerted by the positioning means on the edge of the film is kept constant. Accordingly, the positioning means is kept in contact with the edge of the film, by which the magnetic head is always kept in a precise position with respect to the magnetic surface of the film, thus preventing an occurrence of signal error in reading and/or writing magnetic information relative to the magnetic surface of the film as well.

Preferably, the lever is biased by the biasing means.

Preferably, the magnetic head assembly comprises supporting means on which the magnetic head and the positioning means are mounted, by which mechanism the positional relation between the magnetic head and the positioning means are always kept constant to make it possible to position the magnetic head with respect to the magnetic surface of the film with the edge of the film being set to contact the positioning means.

Preferably, the positioning means comprises a pair of pins located on both sides of the magnetic head with respect to a direction in which the film is fed, by which mechanism it makes sure that the magnetic head is kept in a precise position with respect to the magnetic surface of the film not only by keeping the distance between the magnetic head and the edge of the film constant, but also by keeping the angle made between the magnetic head and the magnetic surface of the film constant, thus preventing the occurrence of signal errors in writing and/or reading the magnetic information relative to the magnetic surface of the film.

BRIEF DESCRIPTION OF THE DRAWINGS

This and other objects and features of the present invention will become clear from the following description taken in conjunction with the preferred embodiment thereof with reference to the accompanying drawings, in which.

DETAILED DESCRIPTION OF THE INVENTION

Figure 1:
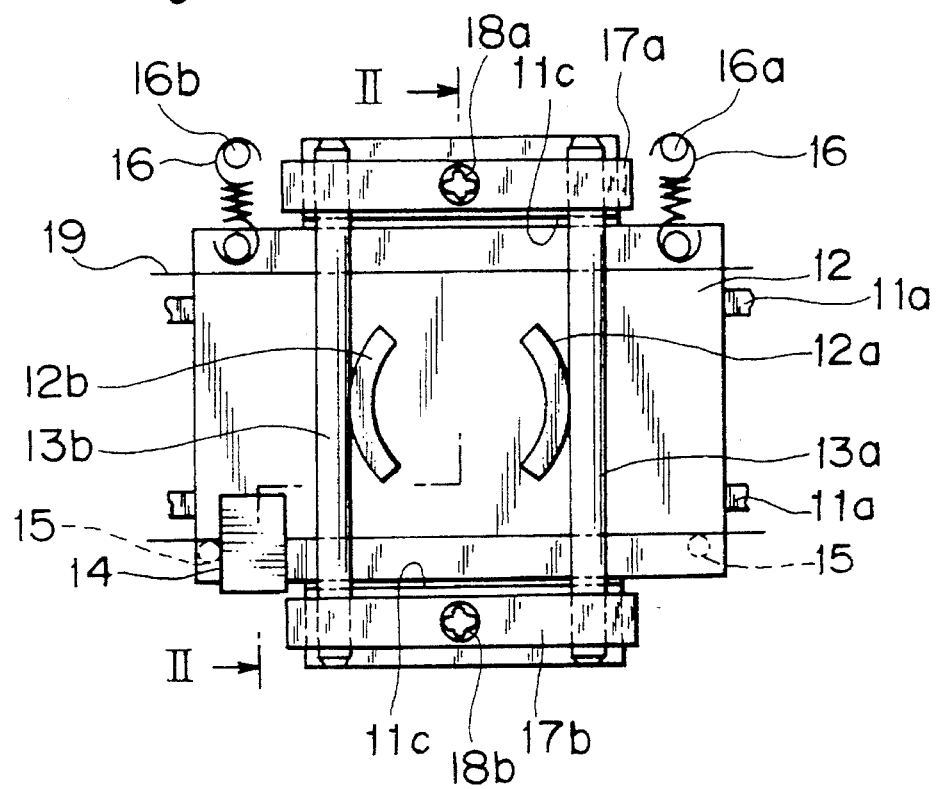
FIG. 1 is a rear elevation view of an essential part of a camera in which a conventional mechanism for positioning a magnetic head relative to a magnetic surface of a film is mounted.
Figure 2:
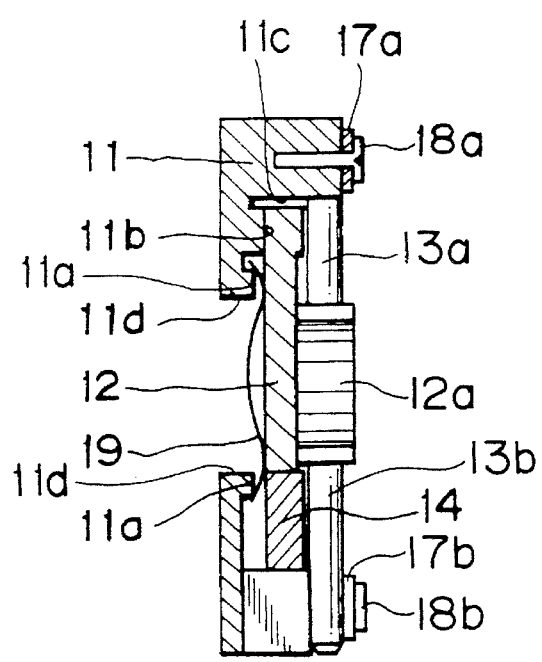
FIG. 2 is a cross sectional view taken along the line II—II of FIG. 1.
Figure 3:
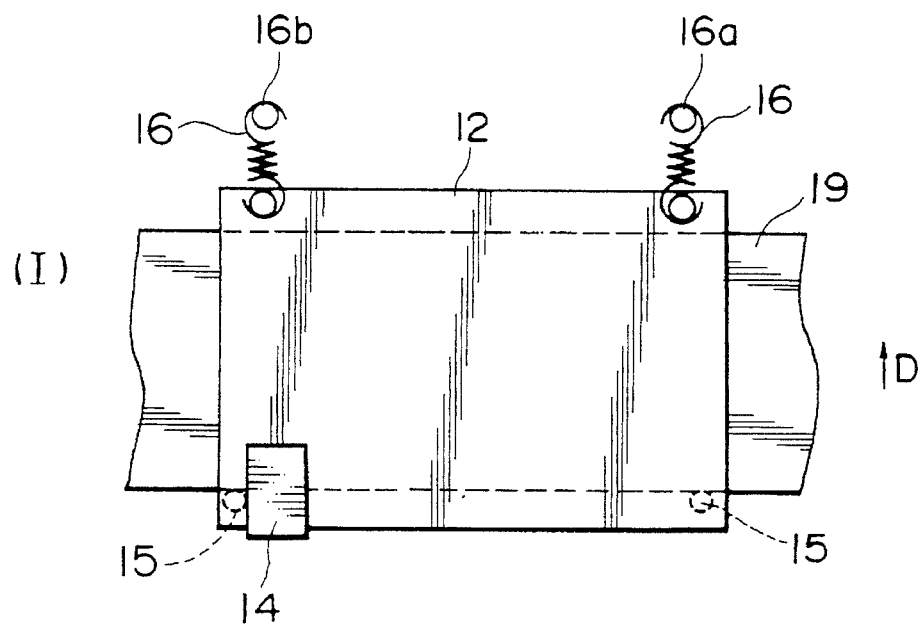
FIGS. 3 (I) and (II) are diagrammatic views showing the positional relationship between the mechanism of FIG. 1 and the film before and after an impulse being exerted on the camera body.
Figure 3:
Figure 3:
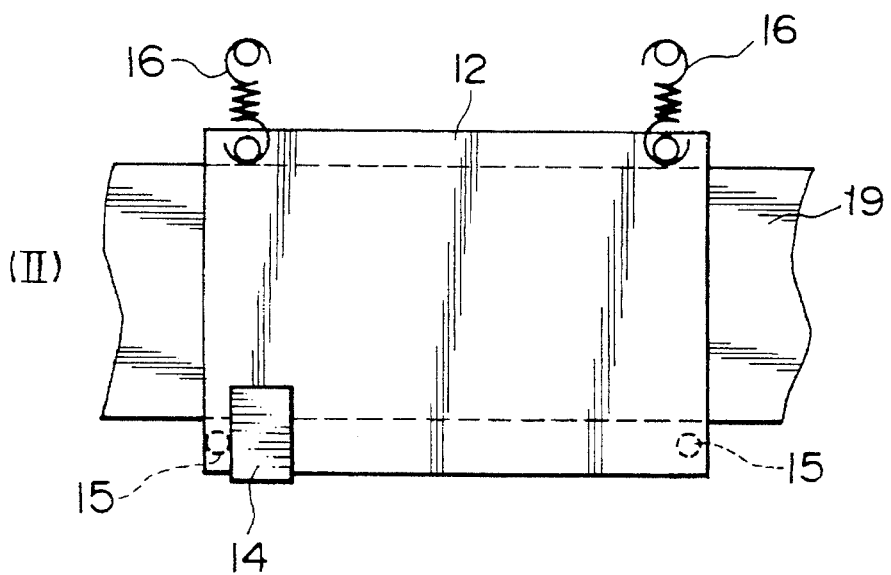

Before the description of the present invention proceeds, it is to be noted that like or corresponding parts are designated by like reference numerals throughout the accompanying drawings.

Figure 4:
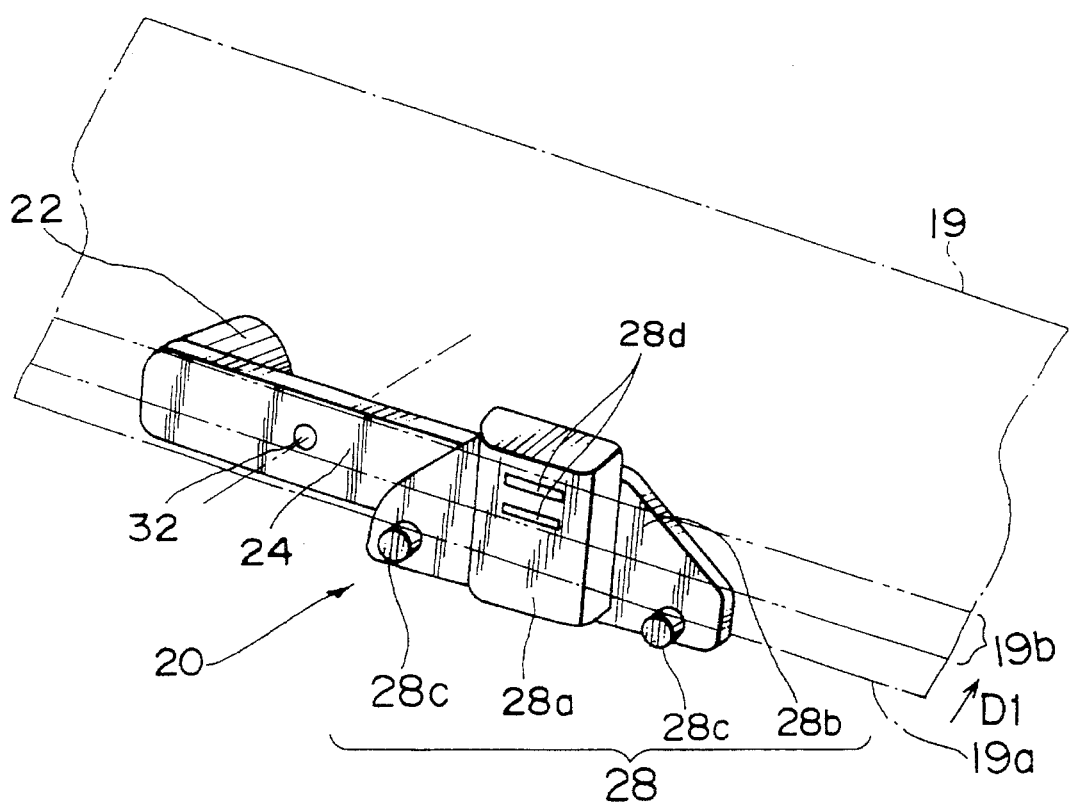
FIG. 4 is a perspective view of a mechanism, embodying the present invention, for positioning a magnetic head relative to a magnetic surface of a film, which is shown from a front side of a camera in which the mechanism is provided.
Figure 5:
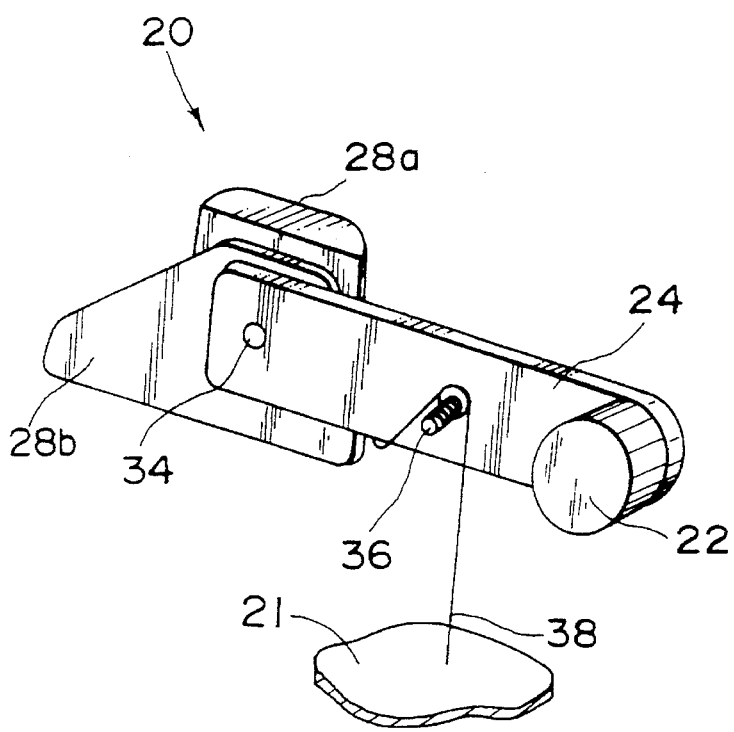
FIG. 5 is a perspective view of the mechanism of FIG. 4, which is shown from a backside thereof.

Referring to FIGS. 4 and 5, description is made below of a mechanism, which is provided in a camera as one example, for positioning a magnetic head relative to a magnetic surface of a film according to a preferred embodiment of the present invention.

Referring to FIGS. 4 and 5, a reference numeral 21 indicates a frame of the camera, and a numeral 20 a positioning mechanism for positioning a magnetic head relative to a magnetic surface of a film 19, designated by a chain line, which has a magnetic surface 19b for magnetic information, designated by a chain line. As shown in FIGS. 4 and 5, the mechanism 20 comprises a lever 24 rotatably mounted on the frame 21 of the camera or on an unillustrated film pressure plate provided thereon; a magnetic head assembly 28 rotatably mounted on one end of the lever 24; and a balancer 22 provided on the other end thereof. The magnetic head assembly 28 comprises a support plate 28b rotatably mounted on the lever 24; a magnetic head 28a, which has a pair of windows 28d for writing and/or reading magnetic information with respect to the magnetic surface 19b of the film 19, fixed to the support plate 28b; and a pair of pins 28c, which are also fixed to the support plate 28b, disposed on both sides of the magnetic head 28a so as to contact and support an edge 19a extending longitudinally of the film 19.

A numeral 32 indicates a hole formed in the lever 24, located between the balancer 22 and the magnetic head assembly 28, at the position corresponding to a center of gravity of the total system including the lever 24, the magnetic head assembly 28 and the balancer 22. A mounting screw 36 is inserted through the hole 32 of the lever 24 to rotatably mount it on the frame 21 of the camera or on the film pressure plate thereon. In FIG. 5, a numeral 34 indicates a pivot by which the support plate 28b is rotatably mounted on the lever 24.

In FIG. 5, a numeral 38 indicates a torsion spring, with its coiled part being held adjacent the lever 24 by and around the mounting screw 36, with one end thereof being engaged to a predetermined position of the frame 21 of the camera or the film pressure plate, and with the other end thereof engaged to an edge of the lever 24 at a predetermined position located between the hole 32 of the lever 24 and the magnetic head assembly 28 so as to rotate the lever 24 in the direction in which the pins 28c are biased to the edge of the film 19, viz., in the direction in which the lever 24 rotates counterclockwise in FIG. 4.

The windows 28d of the magnetic head 28a for writing and/or reading the magnetic information make it possible to write and/or read any information upon trimming, flashing, attitudes of the camera body and so forth, relative to the magnetic surface 19b of the film 19. The operations of writing and/or reading the information by the windows 28d may be carried out when the camera body is not necessarily set stationary. For instance, they may be done at the time of winding or rewinding the film 19.

As described above, since the magnetic head assembly 28 is adapted to rotate with respect to the lever 24 while the lever 24 is adapted to rotate with respect to the frame 21 of the camera or the film pressure plate mounted thereon, when the film 19 tilts or moves up and down with respect to the frame 21 while the film 19 is being wound or rewound, the pins 28c are always contacted with the edge 19a of the film 19 by faithfully following the movement thereof. In other words, when the film 19 is in motion, the magnetic head 28a and the windows 28d are always kept in precise position with respect to the magnetic surface 19b of the film 19, thus preventing the occurrence of errors in writing and/or reading the magnetic information relative to the magnetic surface 19b of the film 19.

Furthermore, since the lever 24 is rotatably supported by the frame 21 of the camera or the film pressure plate, at the point of center of gravity of the total system including the lever 24, the magnetic head assembly 28 and the balancer 22, when an impulse is exerted on the frame 21 of the camera to move it in a direction as shown by an arrow D1 in FIG. 4 while the film 19 is in motion, there does not occur any rotational moment of the lever 24 about the hole 32 thereof. That is, such an impulse exerted on the frame 21 of the camera does not rotate the lever 24 with respect to the frame 21 and does not change the biasing force of the pins 28c to the edge 19a of the film 19, thus keeping the magnetic head 28a or the windows 28d in precise position with respect to the magnetic surface 19b of the film 19.

Although it is shown above as a preferred embodiment that the positioning mechanism according to the present invention is adapted such that the hole 32 in the lever 24 is made at the position corresponding to the center of gravity of the total system including the lever 24, the magnetic head assembly 28 and the balancer 22, it would be equally acceptable that the hole 32 therein is made in the vicinity of the center of gravity thereof, because even if the location of the hole 32 is a little bit deviated away from the correct center of gravity, the rotational momentum of the lever 24 would be compensated by the basing force of the spring 38 when the frame of the camera is accelerated in one direction.

And although it is shown above as a preferred embodiment that the positioning mechanism according to the present invention is applied to a camera in which the film having the magnetic surface is used, it is apparent that the mechanism is applicable to any other apparatus, such as a projector, a developing machine and a printer, for which the same type of film having the magnetic surface is used.

In addition, although the present invention has been fully described in connection with the preferred embodiment thereof with reference to the accompanying drawings, it is to be noted that various changes and modifications are apparent to those skilled in the art. For example, it will be possible to provide the magnetic head 28a with only one window for writing or reading magnetic information, instead of providing the magnetic head 28a with a pair of windows 28d as illustrated in the preferred embodiment. Such changes and modifications are to be understood as included within the scope of the present invention as defined by the appended claims unless they depart therefrom.

What is claimed is:

1. A mechanism, for positioning a magnetic head relative to a magnetic surface of a film, for use in an apparatus in which the film is used, comprising:

a magnetic head assembly having a magnetic head for reading and/or writing magnetic information with respect to the magnetic surface of the film and a positioning member which positions the magnetic head relative to the magnetic surface of the film by contacting an edge extending longitudinally of the film;

a balancer;

a bias member which biases the positioning member towards the edge of the film; and a lever which is mounted by a pivot on a frame of the apparatus such that said lever is rotatable about said pivot but incapable of translational movement in a direction transverse to a longitudinal direction of said lever, wherein the magnetic head assembly is mounted on the lever at one end thereof relative to the pivot whereas the balancer is mounted on the lever at the other end thereof, and wherein the pivot is positioned in the vicinity of a center of gravity of a total system including the magnetic head assembly, the lever and the balancer.

2. A mechanism as claimed in claim 1, wherein the lever is biased by the bias member.

3. A mechanism as claimed in claim 1, wherein the positioning member comprises a pair of pins which are located on both sides of the magnetic head with respect to a direction in which the film is fed.

4. A mechanism as claimed in claim 1, wherein the magnetic head assembly is rotatably mounted by a pivot on the lever.

5. A mechanism, for positioning a magnetic head relative to a magnetic surface of a film, for use in an apparatus in which the film is used, comprising:

a magnetic head assembly having a magnetic head for reading and/or writing magnetic information with respect to the magnetic surface of the film, a positioning member which positions the magnetic head relative to the magnetic surface of the film by contacting an edge extending longitudinally of the film, and a supporting member which supports the magnetic head and the positioning member;

a balancer;

a bias member which biases the positioning member towards the edge of the film; and a lever which is mounted by a pivot on a frame of the apparatus such that said lever is rotatable about said pivot but incapable of translational movement in a direction transverse to a longitudinal direction of said lever, wherein the magnetic head assembly is mounted on the lever at one end thereof relative to the pivot whereas the balancer is mounted on the lever at the other end thereof, and wherein the pivot is positioned in the vicinity of a center of gravity of a total system including the magnetic head assembly, the lever and the balancer.

6. A mechanism as claimed in claim 5, wherein the positioning member comprises a pair of pins located on both sides of the magnetic head with respect to a direction in which the film is fed.

7. A mechanism as claimed in claim 5, wherein the supporting member is rotatably mounted by a pivot on the lever.

8. A mechanism as claimed in claim 5, wherein the lever is supported by a film pressure plate provided in the apparatus.

9. A mechanism as claimed in claim 6, wherein the lever is supported by a film pressure plate provided in the apparatus.

10. A mechanism for positioning a magnetic head relative to a magnetic surface of a film, for use in an apparatus in which the film is used, comprising:

a magnetic head assembly having at magnetic head for reading and/or writing magnetic information with respect to the magnetic surface of the film, a positioning member which positions the magnetic head relative to the magnetic surface of the film by contacting an edge extending longitudinally .of the film, and a support member which supports the magnetic head and the positioning member;

a balancer;

a bias member which biases the positioning member toward the edge of the film; and a lever rotatably mounted by a pivot on a frame of the apparatus, wherein the magnetic head assembly is mounted on the lever at one end thereof relative to the pivot whereas the balancer is mounted on the lever at the other end thereof, wherein the pivot is positioned in the vicinity of a center of gravity of a total system including the magnetic head assembly, the lever and the balancer, and wherein the bias member comprises a spring supported at a position of the pivot of the lever, the spring having one end engaged to the frame of the apparatus and the other end engaged to the lever at a predetermined position thereof between the pivot of the lever and the magnetic head assembly so as to bias the lever.

11. A mechanism for positioning a magnetic head relative to a magnetic surface of a film, for use in an apparatus in which the film is used, comprising:

a magnetic head assembly having a magnetic head for reading and/or writing magnetic information with respect to the magnetic surface of the film, a positioning member comprising a pair of pins located on both sides of the magnetic head with respect to a direction in which the film is fed for positioning the magnetic head relative to the magnetic surface of the film by contacting an edge extending longitudinally of the film, and a support member which supports the magnetic head and the positioning member;

a balancer;

a bias member which biases the positioning member toward the edge of the film; and a lever rotatably mounted by a pivot on a frame of the apparatus, wherein the magnetic head assembly is mounted on the lever at one end thereof relative to the pivot whereas the balancer is mounted on the lever at the other end thereof relative thereto, wherein the pivot is positioned in the vicinity of a center of gravity of a total system including the magnetic head assembly, the lever and the balancer and wherein the bias member comprises a spring supported at a position of the pivot of the lever, the spring having one end engaged to the frame of the apparatus and the other end engaged to the lever at a predetermined position thereof between the pivot of the lever and the magnetic head assembly so as to bias the lever.

12. An apparatus in which a film having a magnetic surface is used, comprising:

a magnetic head for reading and/or writing magnetic information with respect to the magnetic surface of the film; and a position control mechanism which cancels a force of inertia that arises on the magnetic head so as to keep the magnetic head in position with respect to the magnetic surface of the film when a force is exerted on the apparatus, said position control mechanism comprising:

a mount member on which the magnetic head is mounted;

a positioning member which positions the magnetic head relative to the magnetic surface of the film by contacting an edge extending longitudinally of the film, the positioning member being mounted on the mount member;

a balancer;

a bias member which biases the positioning member towards the edge of the film; and a lever rotatably mounted by a pivot on a frame of the apparatus, wherein the mount member is rotatably mounted on the lever at one end thereof relative to the pivot whereas the balancer is mounted on the lever at the other end thereof, and wherein the pivot is positioned in the vicinity of a center of gravity of a total system including the magnetic head, the mount member, the positioning member, the balancer and the lever.

13. An apparatus as claimed in claim 12, wherein the positioning member comprises a pair of pins located on both sides of the magnetic head with respect to a direction in which the film is fed.

* * * * *